United States Patent Office 3,151,036
Patented Sept. 29, 1964

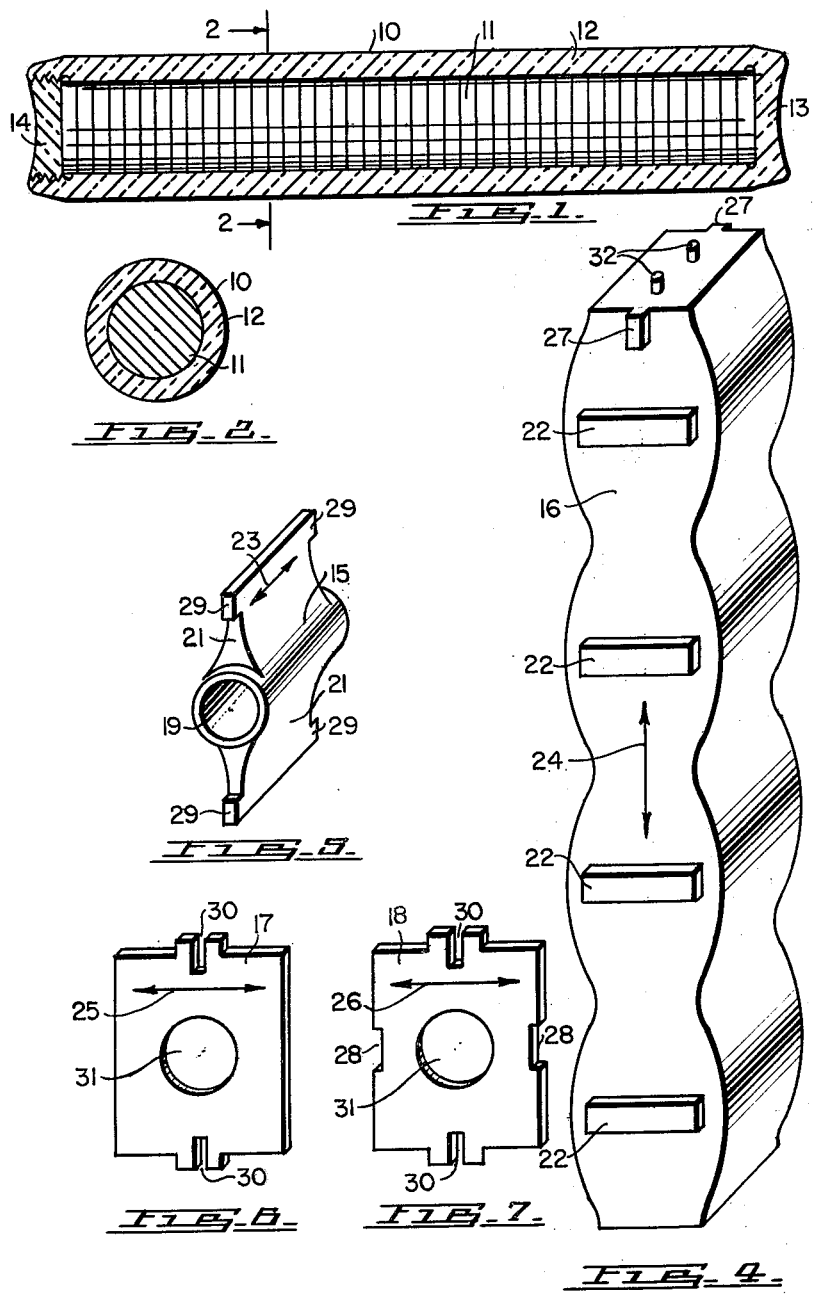

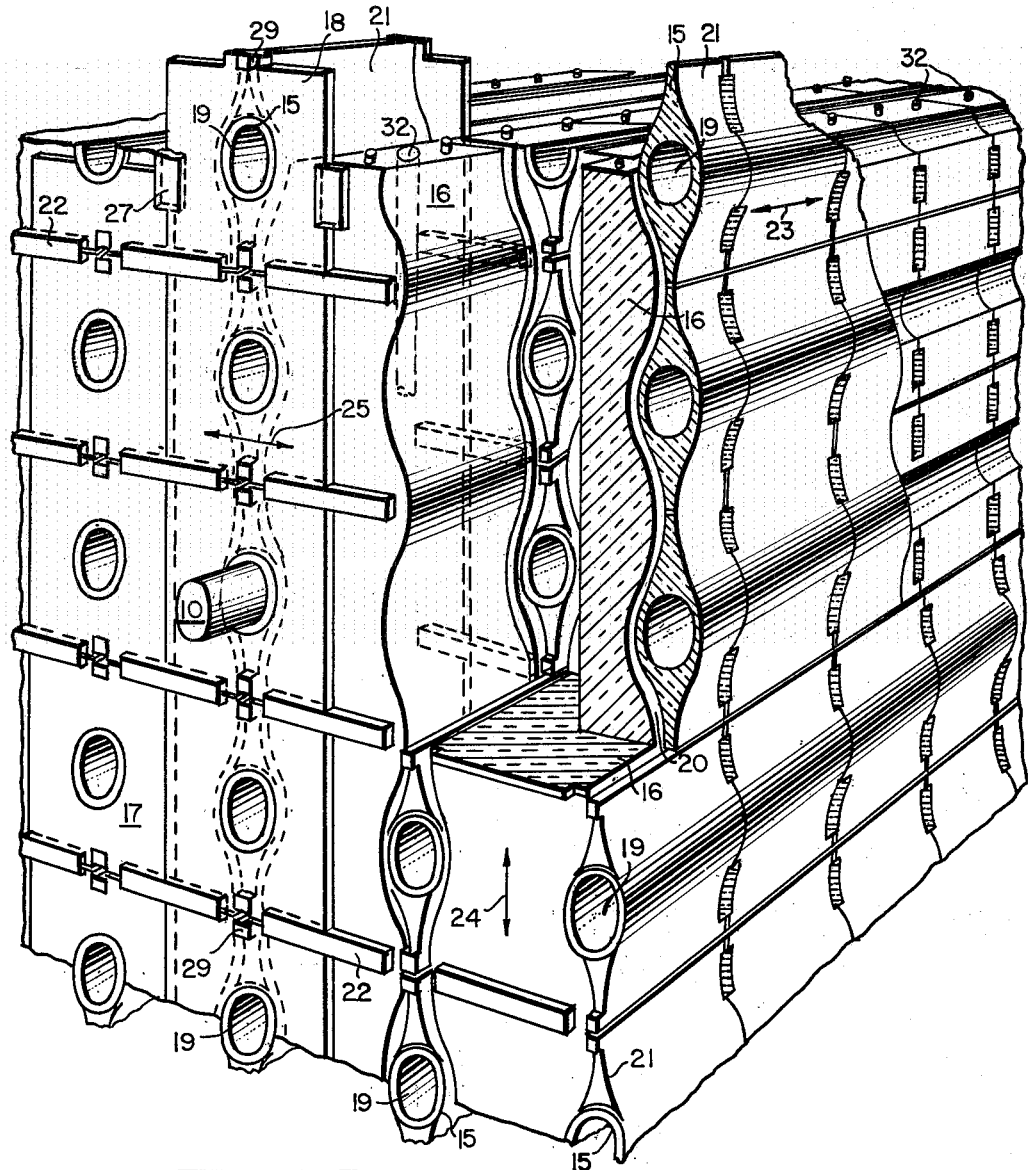

3,151,036
HIGH TEMPERATURE, SOLID MODERATED, CERAMIC FUELLED, GAS COOLED, HEAT PRODUCING NUCLEAR REACTOR
Winnett Boyd, Bobcaygeon, Ontario, Canada, assignor, by mesne assignments, to Arthur D. Little, Inc., Cambridge, Mass., a corporation of Massachusetts
Filed Aug. 4, 1959, Ser. No. 831,601
2 Claims. (Cl. 176—58)

The invention relates to the general arrangement of the essential or reacting materials constituting a nuclear reactor of a type which may be described as a high temperature, solid moderated, ceramic fuelled, gas cooled, heat producing nuclear reactor.

In a nuclear reactor of this type the essential or reacting materials are the fuel and the moderating material. The fuel is usually composed of a mixture of both fissile and fertile material in rod form and arranged in a regular geometric pattern within the moderating material. The usual regular geometric pattern is to have the fuel rods arranged in holes in the solid moderating material in a square lattice with the longitudinal axes of the rods either vertical or horizontal. Since this type of reactor is a heat producing device, provision must be made for the flow of a coolant through the reactor and thence through an external circuit where the coolant can give up the heat which it has acquired while passing through the reactor.

Prior to the present invention, the conventional practice for gas cooled, graphite moderated heat producing, or power reactors, as they are generally known, was to use metallic fuel elements suitably sheathed with a magnesium rich alloy and carbon dioxide as the cooling gas. The fuel sheathing served the dual purpose of containing the radioactive fission products and providing the necessary additional cooling surface for the metallic fuel. With this arrangement the maximum temperature of the outlet gas is limited to a relatively low figure by the properties of the sheathing metal and the metallic fuel itself as well as by the carbon-carbon dioxide reaction which increases with temperature. Thus, while reactors of this type are currently being used as the heat sources for a number of thermo-electric power stations and no doubt will continue to be so used for some years to come, their relatively low maximum permissible temperature results in a relatively high specific capital cost and a relatively low thermodynamic efficiency.

Because of the relatively low maximum permissible fuel and sheathing temperatures in these known reactors, heat transfer becomes a paramount consideration and largely influences the design of the reactor. Thus, in reactors of this type the cooling gas is made to pass directly over the sheathed surfaces of the metallic fuel elements which are almost invariably provided with extended surfaces on the outside of the sheathing to improve the overall heat transfer. Because of a number of considerations including the fact that the fuel elements have extended surfaces, reactors of this type are usually arranged with vertical fuel elements, vertically upward cooling flow and vertical fuel handling either from the top or the bottom or both.

The present invention provides a nuclear heat producing reactor capable of operating efficiently at higher temperatures. A reactor according to the invention comprises a moderator composed of solid material, elongated fuel elements composed of solid material and regularly spaced in the moderator, the longitudinal axes of the fuel elements being horizontal, and passageways through the reactor for the flow of the cooling gas in a vertical direction. Preferably, the fuel elements are disposed within hollow tubes having their axes horizontal and arranged in a regular geometric pattern within the moderator. The tubes form part of the sides of the passageways so that the cooling gas in its vertical passage through the reactor flows across the tubes.

According to a preferred embodiment of the invention the fuel elements are disposed within hollow fuel channel tubes having their axes horizontal. The moderator comprises graphite or beryllium oxide blocks arranged with their longitudinal axes vertical and so shaped on two of their sides as to accommodate the hollow horizontal fuel channel tubes while forming flow passages to permit the flow of cooling gas in the vertical direction across the horizontal fuel channel tubes. The fuel channel tubes are made in short lengths approximately equal to the width of the moderator blocks and are supported by flat plates having holes to accommodate the fuel channel tubes. The flat plates are supported by keys or the equivalent formed on the sides of the moderator blocks which are in planes at ninety degrees to the planes of the longitudinal axes of the fuel channel tubes.

It is a feature of the invention that, in the case of using graphite throughout the moderator structure, Wigner growth in the reactor can be kept to a minimum without recourse to special key pieces etc. This important advantage is obtained according to the invention by having the extrusion axis of each moderator block parallel to the longitudinal axis of the block. The extrusion axis of each graphite fuel channel tube for the fuel elements is parallel to the longitudinal axis of the fuel channel tube and, in the case of the graphite flat plates for supporting the fuel channel tubes, the extrusion axes of the graphite are parallel to the sides of the flat plates and horizontal when the flat plates are assembled in the reactor.

An important advantage of a reactor according to the invention is that fuel elements of ceramic material can be used, thereby permitting more efficient high temperature operation. One of the properties of a ceramic material is its low tensile strength and this property precludes the handling of this type of fuel element vertically in the conventional manner from the top of the reactor, i.e. in tension. An alternative was to handle the fuel elements vertically from the bottom, i.e. in compression. Vertical handling from the bottom of the reactor has the serious disadvantage that the fuel handling equipment and the reactor support structure frequently conflict with each other. These difficulties are avoided in the present invention by the horizontal arrangement for the fuel elements combined with vertically upward cooling flow of the coolant gas.

The invention will be described further with reference to the accompanying drawings in which:

FIGURE 1 shows a longitudinal section of a fuel element;

FIGURE 2 shows a cross-section on the line 2—2 of FIGURE 1;

FIGURE 3 shows a segment of a nuclear reactor according to the invention;

FIGURE 4 shows a moderator block used in the reactor illustrated by FIGURE 3;

FIGURE 5 shows a fuel channel tube used in the reactor illustrated by FIGURE 3; and FIGURES 6 and 7 show support plates used in the reactor illustrated by FIGURE 3.

In the description which follows it will be assumed that the fuel is a mixture of the monocarbides of fertile uranium 238 and/or thorium 232 and fissile uranium 233, 235, and/or plutonium 239. It will further be assumed that the fuel elements will be in slug form with each slug consisting of a series of disc-like wafers of the above carbides packed into the bore of a cylindrical graphite tube which is structurally closed with graphite plugs at each end. As graphite is a porous material this type of fuel element will not contain the gaseous and volatile fission products. They will therefore diffuse out of the fuel elements and into the cooling gas creating what is known as "an active cooling circuit." It will also be assumed that the solid moderating material is a high purity nuclear grade graphite in block form with the blocks arranged so that the cooling gas may pass between them. Finally, the cooling gas will be assumed to be helium. The above specific materials are preferred choices but other possible combinations include the higher carbides and oxides of uranium, thorium and plutonium for the fuel, beryllium oxide alone or in combination with graphite for the moderator, and nitrogen, carbon dioxide or any other relatively non-reactive gas for the coolant.

FIGURES 1 and 2 show a fuel element 10 which consists of a number of disc-like wafers of fuel 11 packed into the bore of a cylindrical graphite tube 12 which has an integral plug 13 at one end and an insertable plug 14 at the other end.

FIGURE 3 illustrates a segment of a nuclear reactor according to the invention. The reactor shown in FIGURE 3 consists of a number of graphite fuel channel tubes 15, graphite moderator blocks 16, and lateral support plates 17 and 18 arranged in a regular pattern to provide horizontal through holes 19 for the fuel elements 10 and vertical passages 20 for the upward flow of cooling gas. The graphite blocks with which the reactor structure is built are of three distinct types, namely the fuel channel tubes 15 (FIGURE 5), which may or may not have fins on their sides for additional heat transfer surface, the moderator blocks 16 (FIGURE 4), and the lateral support plates 17 and 18 (FIGURES 6 and 7). The fuel channel tubes 15 have round through holes 19 and two diametrically opposite longitudinal ribs 21. These fuel channel tubes are located end to end in the reactor so that their individual through holes line up and thus form long through holes or fuel channels which pass horizontally through the reactor. The individual fuel channel tubes 15 are supported at each end by lateral support plates 17 and 18, which in turn are supported by keys 22 which are formed on one side only of the moderator blocks 16. The top of each moderator block 16 has two keys 32 which fit into keyways on the bottom of the block next above. Two opposite sides of each of the moderator blocks 16 are formed in such a way as to give them a multiple hour-glass shape. Thus, when the blocks 16 are built into a pile along with the fuel channel tubes 15 and lateral support plates 17 and 18, the gaps between the fuel channel tubes 15 and the moderator blocks 16 form continuous cooling passages 20 which extend vertically from the bottom to the top of the reactor. The longitudinal ribs 21 on the fuel channel tubes 15 contribute to the structural strength of the fuel channel tubes and increase their outside surface area, thus promoting the transfer of heat to the cooling gas flowing over them. Each fuel channel tube 15 is supported by lateral support plates 17 or 18 with keys 29 fitting into keyways 30 and with its tubular ends fitting into holes 31 in the lateral support plates. Control rods may be provided for by having a vertical hole 32 (FIGURE 3) in, for example, every fourth vertical column of moderator blocks 16.

This configuration of nuclear reactor does not have as large a heat transfer area as does one which employs metallic fuel elements with extended surfaces. However, such a large heat transfer area is not required because higher temperatures and temperature differences are possible with ceramic fuels sheathed in graphite.

When graphite is bombarded by neutrons it suffers a certain amount of inter-crystalline damage which causes it to distort or grow. This is known as "Wigner growth." It has been observed that the Wigner growth in graphite is not uniform and that it is always much greater in directions normal to the axis of extrusion than it is parallel to the axis of extrusion. It has also been observed that Wigner growth is temperature sensitive and is greater at low temperatures than at high temperatures. For this reason all graphite moderated nuclear reactors, which always have a moderately low temperature region at inlet, are constructed in such a way as to minimize the changes in their overall dimensions due to Wigner growth.

In a reactor according to the present invention the changes in the overall dimensions of the graphite structure due to Wigner growth are minimized both by the arrangement of the graphite blocks 15, 16, 17 and 18 within the overall structure as well as by the proper orientation of the graphite extrusion axis relative to the blocks themselves. In the fuel channel tubes 15 the extrusion axis 23 is longitudinal, i.e. parallel to the through hole 19. In the moderator blocks 16 the extrusion axis 24 is longitudinal. In the lateral support plates 17 and 18 the extrusion axes 25 and 26 are parallel to the flat sides and in each case normal to the line joining the two key slots.

In the graphite structure of the reactor as shown in FIGURE 3, the entire weight of the moderator blocks 16, the lateral support plates 17 and 18, the fuel channel tubes 15, and the fuel elements 10 is carried down to the supporting structure through moderator blocks 16 whose longitudinal and extrusion axes are vertical. Thus the total Wigner growth in the vertical direction will be a minimum because it will be growth parallel to the axis of extrusion. In the horizontal direction parallel to the axis of the through holes 19 in the fuel channel tubes 15, the Wigner growth will be predominantly growth parallel to the axis of extrusion but a portion of it will be growth perpendicular to the axis of extrusion because of the lateral support plates 17 and 18 which support the fuel channel tubes 15. In the horizontal direction perpendicular to the fuel channel tubes 15, the Wigner growth will all be growth parallel to the axis of extrusion as vertical keys 27 on the moderator blocks 16 will be loose fits in the mating keyways 28 (FIGURE 7) in the lateral support plates 18.

This nuclear reactor structure makes possible the combination of horizontal fuel elements with vertical cooling flow. The relationship of the extrusion axes 23, 24, 25 and 26 to the four graphite blocks 15, 16, 17 and 18 and their arrangement one with the other keeps to a minimum the effects of Wigner growth on the overall dimensions of the reactor without recourse to special key pieces, etc. such as have been used in previously known reactors.

What I claim as my invention is:

1. A nuclear heat producing reactor structure adapted to contain fissile and fertile material in rod form, comprising in interlocked combination fuel channel tubes, moderator blocks, and lateral support plates, each of said fuel channel tubes having a horizontally disposed fuel channel and two diametrically opposed vertically disposed ribs, said ribs and said channel being located in substantially the same plane, each of said ribs being provided at each end with an upper and a lower key, said tubes being arranged end to end to provide fuel channels passing horizontally through the reactor, said moderator blocks being elongated in a vertical direction and being provided along their outer vertical sides with keys, said blocks and said tubes being arranged side by side in alternate vertical tiers of matching configuration and spaced apart to provide a vertical passageway between each of said vertical tiers of blocks and the vertical tier of tubes on each side thereof, and extending unimpeded from bottom to top of the reactor for upward flow of cooling gas, said passageways constituting the sole conduits for cooling gas within said reactor, said support plates being arranged in vertical planes at right angles to the axes of the fuel channels, and having holes corresponding with said fuel channels; said plates being provided with keyways in to which said keys of said ribs and of said moderator blocks are positioned so that the structure is supported and said blocks and said tubes are maintained in predetermined spaced relationship with each other.

2. A nuclear heat-producing reactor in accordance with claim 1, wherein said moderator blocks and said fuel channel tubes are of graphite and have their extrusion axes parallel to their longitudinal axes, and said lateral support plates are of graphite in which the extrusion axis is parallel to the sides of said plates and horizontal in the assembled reactor.

References Cited in the file of this patent

UNITED STATES PATENTS

| | | |
|---|---|---|
| 2,831,807 | McGarry | Apr. 22, 1958 |
| 2,864,759 | Long | Dec. 16, 1958 |
| 2,865,828 | Long | Dec. 23, 1958 |
| 2,872,398 | Ashley et al. | Feb. 3, 1959 |
| 2,970,097 | Correc | Jan. 31, 1961 |

FOREIGN PATENTS

| | | |
|---|---|---|
| 782,888 | Great Britain | Sept. 11, 1957 |

OTHER REFERENCES

Nucleonics, "Small Gas Cycle Reactor," Daniels, March 1956, pages 34–44.

Nuclear Science and Engineering, "Heat Transfer in a Cross Flow Nuclear Reactor," vol. 4, No. 5 (1958), pages 607–608.

Nucleonics, vol. 14, No. 9, September 1956, pages 63–65. (Copy in Div. 46.)